United States Patent [19]

Helms

[11] Patent Number: 4,508,233

[45] Date of Patent: Apr. 2, 1985

[54] COMPACT HEAVY DUTY LIFTING CRANE

[76] Inventor: Thomas G. Helms, 19036 Napa St., Northridge, Calif. 91324

[21] Appl. No.: 479,866

[22] PCT Filed: May 21, 1981

[86] PCT No.: PCT/US81/00691

§ 371 Date: Jan. 18, 1983

§ 102(e) Date: Jan. 18, 1983

[51] Int. Cl.[3] .......................... B66C 23/26; B60P 1/00; B65G 7/08

[52] U.S. Cl. .................................... 212/182; 212/189; 212/199; 212/203; 212/231; 212/232; 212/238; 212/239; 212/244; 212/264; 212/265; 254/8 B; 254/124; 414/543

[58] Field of Search ................................ 212/182–184, 212/187, 189, 192–193, 199, 203–204, 211, 223, 227, 229–231, 237–239, 244, 249, 254, 261–262, 264–265, 267; 414/542–543; 254/8 B, 124

[56] References Cited

U.S. PATENT DOCUMENTS

| | | | |
|---|---|---|---|
| 2,554,900 | 5/1951 | Davies | 254/124 |
| 2,605,002 | 7/1952 | Groves | 212/203 |
| 2,610,743 | 9/1952 | English et al. | 212/183 |
| 2,924,428 | 2/1960 | Whittall et al. | 254/124 |
| 3,275,296 | 9/1966 | Meyer | 212/265 |
| 3,521,860 | 7/1970 | Zehrung, Jr. et al. | 254/124 |
| 4,021,017 | 5/1977 | Adams | 254/8 B |
| 4,090,625 | 5/1978 | Walters | 212/265 |

FOREIGN PATENT DOCUMENTS

| | | | |
|---|---|---|---|
| 555862 | 4/1958 | Canada | 414/542 |
| 102041 | 4/1963 | Norway | 212/199 |
| 139468 | 3/1953 | Sweden | 212/231 |
| 658579 | 10/1951 | United Kingdom | 414/543 |
| 740503 | 11/1955 | United Kingdom | 254/124 |

*Primary Examiner*—Trygve M. Blix
*Assistant Examiner*—R. B. Johnson
*Attorney, Agent, or Firm*—Albert O. Cota

[57] ABSTRACT

A Compact Heavy Duty Lifting Crane (CHDLC) for removing and installing heavy objects such as engines and transmission from vehicles. The CHDLC incorporates a feature that allows the vertical lifting angle of the telescoping boom (40) to remain constant as the telescoping pylon cylinder (18) is raised. This feature is particularly useful for removing engines located in limited-space engine compartments such as those encountered in vans and buses. The CHDLC consists of two major assemblies: a base assembly and a portable lifting crane. When the CHDLC is used as a standard utility crane in a repair shop the crane is mounted to the base assembly. When the CHDLC is required to be mounted on a truck bed the crane is removed from the base assembly and installed on a truck pylon plate (14*a*) that is permanently mounted to the bed of the truck. Additionally, the CHDLC may be placed in its storage configuration. In this configuration the CHDLC occupies a horizontal area of only four square feet.

11 Claims, 14 Drawing Figures

COMPACT HEAVY DUTY LIFTING CRANE

TECHNICAL FIELD

The invention pertains to the field of cranes and especially to portable cranes incorporating features that allow the crane to be mounted to a base assembly for use in vehicle repair shops or mounted to the bed of a pickup truck for use at remote locations. The invention is particularly adaptable for use in vehicle repair shops for removing and/or installing automotive engines located in engine compartments with limited space.

BACKGROUND ART

The problems encountered by mechanics in removing and/or installing engines and transmissions from vehicles has caused the loss of a considerable amount of time. The removal and installation of engines from vans and buses is a particularly difficult and time consuming task due to the limited space available in the engine compartment. To facilitate the removable or installation of a van engine a lifting boom angle that remains constant as the boom is raised is a highly desirable feature. A search of the prior-art did not disclose any patents or publications that disclosed cranes providing such a constant lifting boom angle or the additional portability and storage features available with the instant invention. However, the following U.S. patents were determined to be related:

| U.S. PAT. NO. | INVENTOR | ISSUED |
|---|---|---|
| 4,021,017 | Adams | 3 May 1977 |
| 3,059,785 | Buckeye | 23 October 1962 |
| 2,528,329 | Bauer | 31 October 1950 |
| 2,517,813 | Wallace | 8 August 1950 |

The Adams patent discloses a jack for removing such items as large truck gear boxes. The jack is provided with a bifurcated low level frame on which is mounted a vertical structure having a pivoted horizontal boom powered by a hydraulic cylinder.

The Buckeye patent discloses a standard type crane or jack suitable for use in vehicle repair shops for removing motors/engines and transmissions.

The Bauer patent discloses an apparatus for removing engines from an automobile and especially such engines as are used in large buses.

The Wallace patent discloses a portable lifting hydraulic hoist such as are frequently used on loading platforms or the back ends of delivery trucks and the like. The hoist is designed to be lifted by the operator from one base to another.

DISCLOSURE OF THE INVENTION

The Compact Heavy Duty Lifting Crane (CHDLC) is designed to be manually operated by one person and is primarily used for removing and/or installing heavy objects such as engines and transmissions from vehicles. The CHDLC consists of two major assembles: a floor base assembly and a portable lifting crane. An additional mounting plate that is permanently mounted to the bed of a pick-up truck is also disclosed.

The CHDLC has two principal objectives: one is to incorporate portability features that allow the CHDLC to be quickly and easily converted from a vehicle repair shop crane to a truck mounted crane. When used in the shop the portable lifting crane is mounted to the floor base assembly and when used on a truck it is mounted to the truck bed mounting plate.

The second principal objective is to provide a crane that allows the boom lift angle to either remain constant or to increase as the telescoping pylon is raised. The constant angle is particularly important since this feature facilitates the removal and installation of engines located in limited space engine compartments.

Another objective of the invention is to provide a CHDLC that can be quickly and easily converted to a storage configuration that allows the CHDLC to be stored in a horizontal area of approximately four square feet.

A further objective is to provide a CHDLC that can be used speedily and with precision by even inexperienced operators.

Another objective is to have a CHDLC that is rugged in structure and which employs a minimum number of parts such that it is relatively inexpensive to manufacture.

A further objective is to have a CHDLC that is reliable and easily maintainable.

BRIEF DESCRIPTION OF DRAWINGS

The details of the invention are described in connection with the accompanying drawings in which.

BEST MODE FOR CARRYING OUT THE INVENTION

The Compact Heavy Duty Lifting Crane (CHDLC) is described in terms of its two operational modes and its non-operational storage mode. In the operational modes the CHDLC functions as a floor operated crane such as would be used in an automotive repair shop or as mounted to the bed of a pick-up truck for lifting and/or installing loads at remote locations. In the non-operational mode the CHDLC is configured to allow the CHDLC to be stored in a horizontal area of approximately four square feet.

Figure 11:
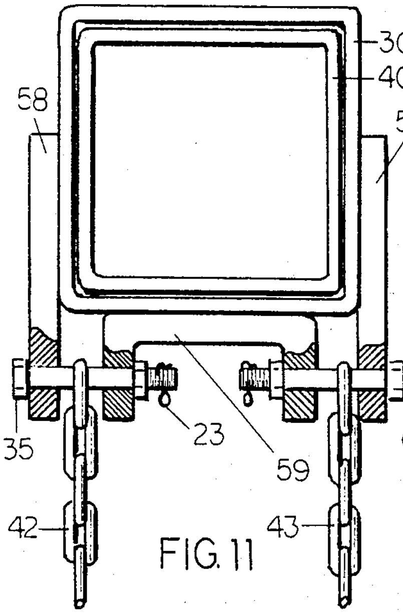
FIG. 11 is a perspective view of the backend of the stationary boom showing an alternate method for attaching the ends of the two control chains.
Figure 12:
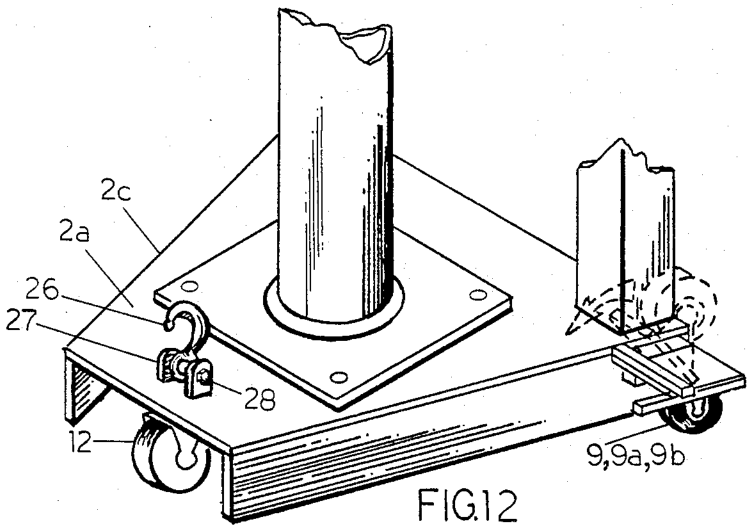
FIG. 12 is a perspective view of the base showing the installation and placement of the retractable base assembly wheels, caster wheel, and the base chain hook.
Figure 14:
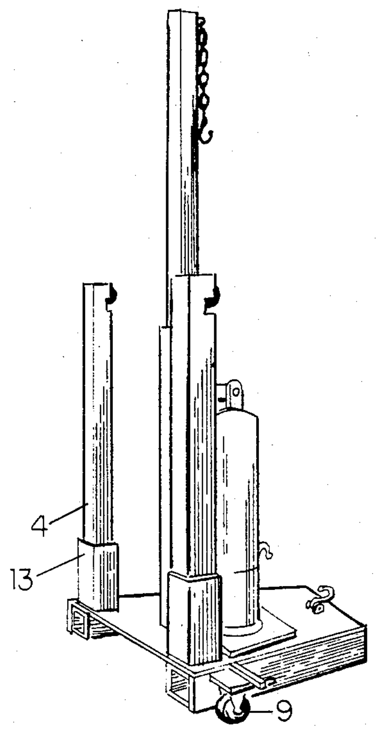
FIG. 14 is a perspective view of the invention shown in the storage configuration.
Figure 13:
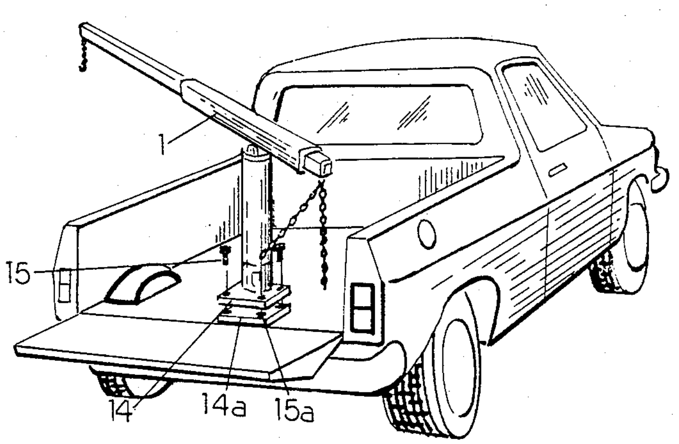
FIG. 13 is a perspective view of the invention mounted to the bed of a pick-up truck.

The CHDLC is shown in its operational configuration as a floor operated crane in FIGS. 1 through 12 while the CHDLC as would be installed on the bed of a pick-up truck is shown in FIG. 13. The non-functional storage configuration is shown in FIG. 14.

The CHDLC consists of two major assemblies: a base assembly and a portable lifting crane assembly. The base assembly is comprised of six major elements: a base plate 2*a*, a set of removable legs 4, a set of leg wheels 8, a set of retractable wheels 9, a caster wheel 12, and a set of leg storage receptacles 13.

The portable lifting crane is comprised of nine major elements: a stationary pylon cylinder 17 attached to a removable pylon plate 14, a telescoping pylon cylinder 18, a stationary boom 30, a telescoping boom 40, a lifting chain and hook assembly 41, a first boom control chain 42, a second boom control chain 43, and a lifting jack 55.

A functional description of the CHDLC now follows: the base assembly is provided with structural integrity by a horizontal base plate 2*a* that is supported by a right channel member 2*b* and a left channel member 2*c*. Both channel members are attached to the underside of the top plate 2*a* by welding or other conventional means. The base plate 2*a* is further supported by the caster wheel 12 which is conventionally attached to the back-center underside of the base plate 2*a*, as best shown in FIG. 12, and by the set of retractable wheels 9. The retractable wheels 9 are each attached to the side of the channel members 2*b* and 2*c* respectively as shown in FIG. 12. When the CHDLC is in the functional configuration the wheels 9 are retracted while in the storage configuration they are extended. The retracting mechanism consists of a conventional offset wheel axle 9*a* and a retracting bar 9*b* that is lifted and rotated to place the wheel 9 in the retracted position. The base plate 2*a* also supports a set of vertically-mounted leg storage receptacles 13 that are dimentioned to allow the removable legs 4 to be inserted when the CHDLC is in the storage mode. The receptacles 13 are shown in their empty configuration in FIG. 1 and with the removable legs 4 inserted in FIG. 14.

The removable legs 4 are inserted into their respective right and left channel members 2*b* and 2*c*. Each leg 4 has a stop 5 welded to the top of the leg which allows the leg to be inserted and held at an optimum distance. To lock the legs in place a leg holding pin 6, held captive by chain 6*a*, is inserted through a hole 7 that projects from the base plate 2*a* into the channels 2*b* and 2*c*.

Figure 2:
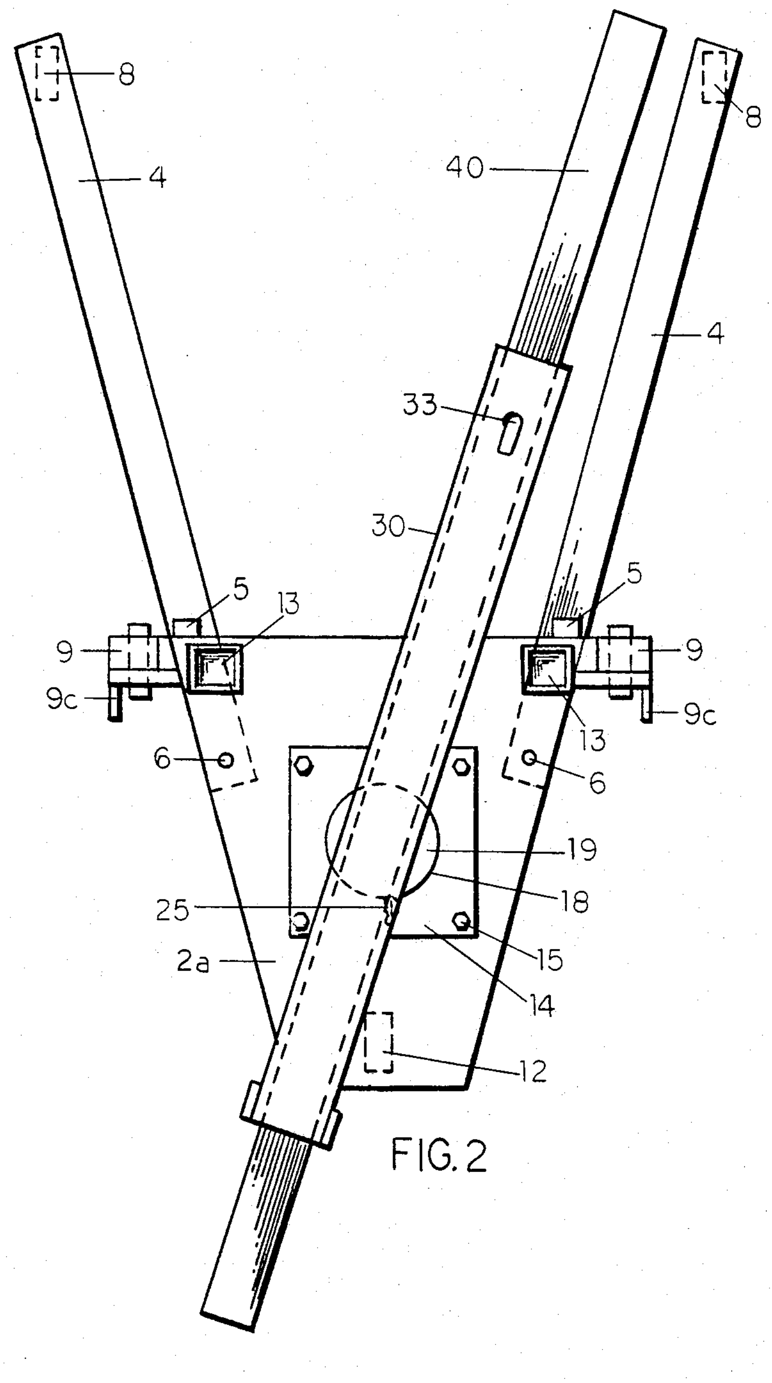
FIG. 2 is a top view of the invention shown in the operational configuration.

The leg wheels 8 are located on the front of the legs 4 and are conventionally retained by an axle held fast to the side walls of their respective channels 2*b* or 2*c*. The legs are angularly positioned as shown in FIG. 2 so that no binding will occur when the base is moved in a forward or backward direction.

Figure 1:
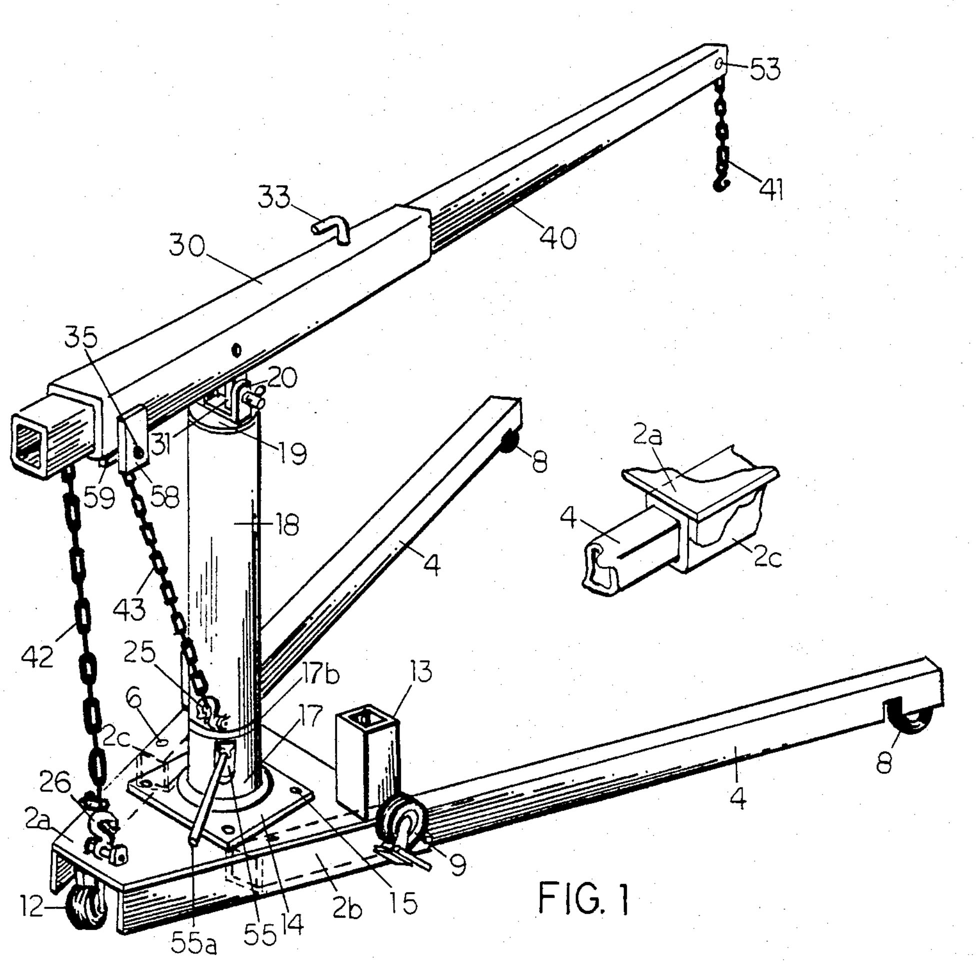
FIG. 1 is a perspective view of the overall invention shown in the operational configuration.
Figure 4:
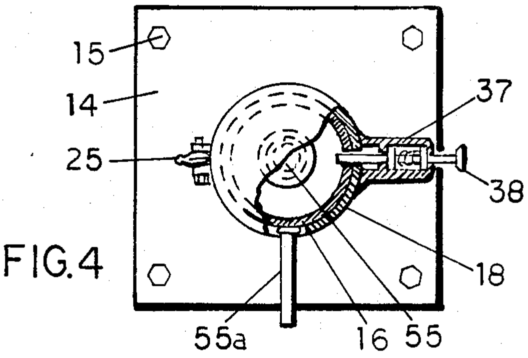
FIG. 4 is a top view of FIG. 3.
Figure 3:
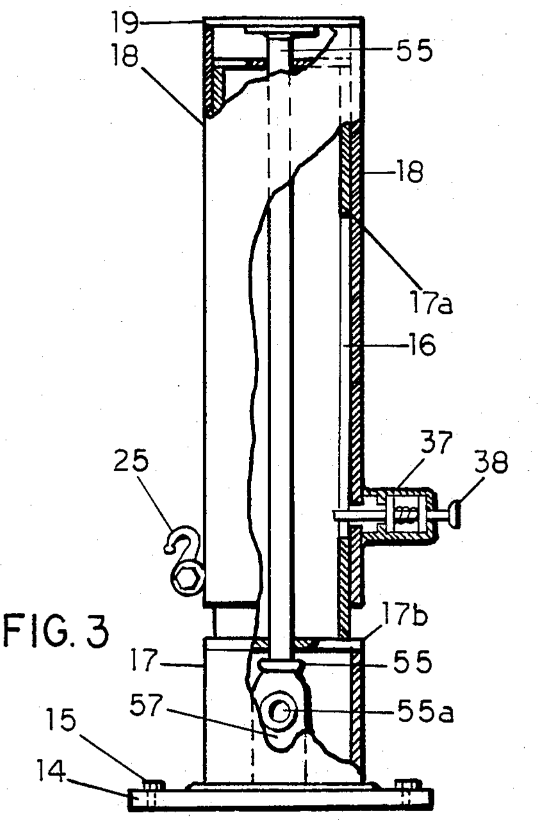
FIG. 3 is a cross sectional view showing the stationary pylon cylinder and the telescoping pylon cylinder with the jack in place and the two pylons locked by the spring-loaded pylon lock.

The primary supporting structure of the portable lifting crane assembly 3 consists of the removable pylon plate 14 to which is rigidly attached, by welding or other means, the stationary pylon cylinder 17. The portable lifting crane when used in a repair shop is attached to the base assembly by bolting the removable pylon plate 14 to the base plate 2*a* by means of bolts 15 as shown in FIG. 1. The cylinder 17 has a plate 17*b* welded to its top to which is further welded an upper pylon cylinder 17*a* as best shown in FIG. 3 and 4. The top plate 17*b* has an aperature dimensioned to allow a lifting jack 55, such as a hydraulic jack, to be inserted. The stationary pylon is also provided with an opening 57 from where the jack control handle 55*a* portrudes. The upper pylon cylinder 17*a* has a slot 16 on one side as shown in FIGS. 3 and 4 whose function is described infra.

The telescoping pylon cylinder 18 is dimensioned to rotatably fit over upper pylon cylinder 17*a*, as shown in FIG. 3, and has an upper plate 19 welded to its top. In operation the top of the jack shaft rests on the bottom of the plate 19 causing the telescoping pylon cylinder 18 to be raised or lowered as dictated by the vertical displacement of the lifting jack 55.

Figure 5:
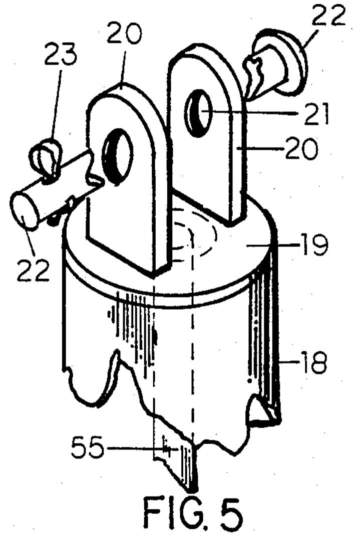
FIG. 5 is a perspective view of the top section of the telescoping pylon cylinder showing the pylon top plate and the outward clevis members.
Figure 8:
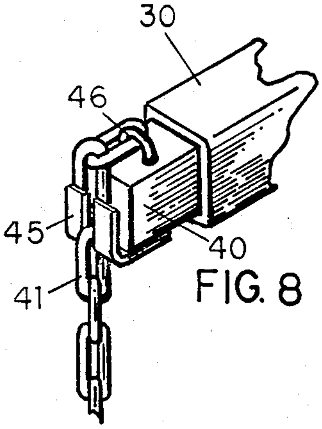
FIG. 8 is a perspective view showing the front end of the telescoping boom with an alternate method of attaching the lifting chain and hook assembly.

To prevent the telescoping pylon cylinder 18 from rotating about the upper pylon cylinder 17 a spring loaded locking mechanism 37 is attached to the outside walls of the cylinder 18. When rotation is desired the plunger 38 is retracted which allows the plunger rod to remain outside the slot 16 in the upper cylinder 17*a*. Conversely when the no rotation is desired, as would be the case when the CHDLC is operating under a load and revolvement is not desired the plunger 38 is released allowing the plunger to enter the slot 16 keeping the upper pylon cylinder 18 in place. As shown in FIG. 5 the top plate 19 also has attached a set of outward clevis members 20 each having concentric holes 21.

Figure 6:
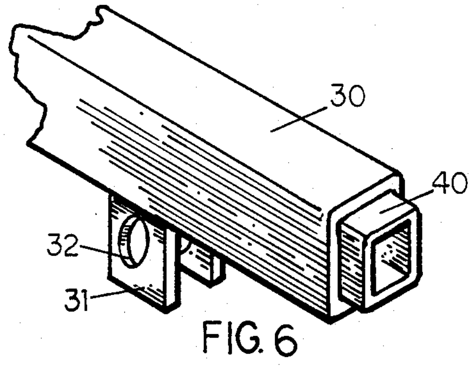
FIG. 6 is a perspective view showing the inward clevis members attached to the fixed boom.

The stationary boom 30 as shown in FIG. 1 and FIG. 6 consists of a rigid hollow tubular member having welded to its lower side at approximately midpoint a left and a right mounting plate 31. The two plates 31 have concentric holes 32 therein that correspond to the holes 21 in the outward clevis members 20 attached to the telescoping pylon top plate 19 as shown in FIG. 5. When the mounting plates 31 are joined to the matching mounting plates 20 a clevis pin 22 is inserted through the holes 21 and 22 and is held in place by a retaining pin 23. The mounting plates 20 and 31 are designed to allow the stationary boom 30 to be displaced about the pin 22 in a vertical direction from 0° (front of boom resting on pylon plate 14) to approximately 175°. The boom 30 by being attached to the plate 19 of the telescoping boom is also free to be radially rotated through a full 360° when the spring loaded pylon lock 37 is disengaged. The stationary boom is equipped with a locking means which may consist of a threaded hole and a pressure screw 33 which binds against the telescoping boom 40 to keep it in place.

Figure 10:
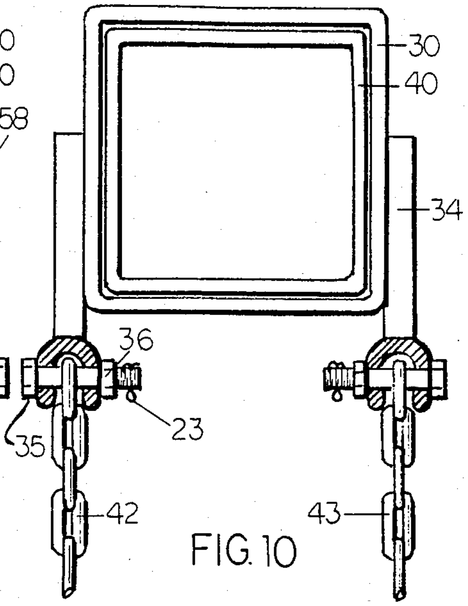
FIG. 10 is a perspective view of the backend of the stationary boom showing a clevis structure for attaching the ends of the two control chains.

Mounted by conventional means to the back end of the stationary boom 30 is a left and right clevis structure 34 as shown in FIG. 10. The clevis structure 34 is used to hold one end of the control chains 42 and 43. The chains are held fast by inserting a chain loop through a pin 35 which is held in place by a bolt 36 and a retaining pins 23. An alternate method would be to employ a outward plate 58 and an inward plate 59 as shown in FIG. 11. The chain would be held in place as described for the clevis structure 34.

The other end of chain 42 is held in place by the pivoted base chain hook 26 located as shown in FIG. 12, while chain 43 is held in place by the rigid pylon chain hook 25 as shown in FIGS. 2 and 3.

Figure 7:
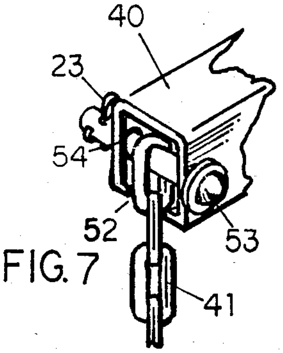
FIG. 7 is a perspective view showing the front of the telescoping boom with a boom chain slot and the lifting chain and hook assembly attached.

The telescoping boom 40 as shwon in FIG. 1 and FIG. 2 consists of a rigid hollow tubular member. The boom 40 is dimensioned so that it easily traverses along the opening of the stationary boom 30. The telescoping boom 40 is displaced along the stationary boom 30 in accordance with the boom length required for any specific job. Mounted to the front end of the telescoping boom 40 is the lifting chain and hook assembly 41. The preferred method to mount the chain and hook 41 is shown in FIG. 7. In this method a slot 52 is cutaway at the lower side wall of the telescoping boom 40 and a set of holes 54 are made through the side walls of the boom 40. The chain and hook assembly 41 is then placed into the slot 52 and a retaining pin 53 is inserted through the holes 54 and one of the chain loops. The pin 53 is held in place either by a retaining pin 23 or a conventioned bolt.

An alternate method for mounting the lifting chain and hook assembly 41 to the telescoping boom 40 is to attach a pair of upturned fingers 45, outstanding from the underside of its forward end, and a chain 41 and chain hook 46 attached to the topside of its forward end. Adjustments to the chain length from the end of the boom is effected by securing a selected chain link in the fingers 45 in an obvious manner.

Figure 9:
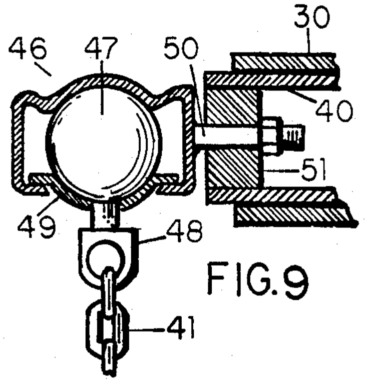
FIG. 9 is a perspective view showing the front end of the telescoping boom equipped with a universal joint for attaching the lifting chain and hook assembly.

A third method for holding the lifting chain and hook assembly 41 is to mount on the front end of the telescoping boom 40 a universal joint structure 46 shown in detail in FIG. 9; wherein a spherical element 47 is coupled to a yoke 48 and the spherical element 47 is held in a conforming socket structure 49 so that the ball 47 may move as a universal joint and thereby permit angular pivotal movement of the yoke 48 in various angular and rotatable directions. The universal joint structure is supported in connection with the telescoping boom 40 by means of a bolt 50 secured in an end portion 51 in the boom 40.

The first boom control chain 42 and second control chain 43 combine to provide one of the innovative characteristics of the invention. Depending on the configuration of the chains two modes of operation are available: mode 1, when the second chain 43 is disengaged from the pylon chain hook 25 and the first chain 42 is connected to the base chain hook 26 a selectable vertical boom angle can be established. The angular displacement of the boom is dependent upon the chain link selected to be connected. Once the boom angle is established it can be made to remain constant as the telescoping pylon 18 is raised by the lifting jack 55. The boom angle is maintained constant by preferably connecting both chains 42 and 43 to the pylon hook 25. A constant boom angle is especially useful for replacing or removing an engine from a limited space engine. Compartment such as found on conventional front engine vans.

Mode 2, when the second chain 43 is disengaged from the pylon chain hook 25 and the second chain 43 is connected to the base chain hook 26 a boom angle is established that constantly increases as the telescoping pylon 18 is raised by the lifting jack 55. This mode of operation is the only mode found on state-of-the-art cranes and hoists.

One of portability features of the CHDLC is that it can be mounted onto a truck bed to further amplify its usefulness. To accomplish this portability three steps are necessary: the first step is to permanently mount a truck pylon plate 14*a* onto a truck bed as shown in FIG. 13. The truck plate 14*a* is dimensioned similarily to the pylon plate 14 with the exception that the corresponding holes 15*a* are threaded to allow the plate 14 to be mounted to the truck plate 14*a* by a threaded fastener. The second step is to unbolt the portable lifting crane 3 from the base assembly 2. This is performed by removing the plurality of bolts 15 which fasten the stationary pylon plate 14 to the base plate 2*a*. The third step is to bolt the portable lifting crane to the truck plate 14*a*.

The CHDLC is designed to be stored in a floor area of approximating four square feet which allows the CHDLC to be easily moved through a conventional sized doorway.

To convert the CHDLC to its storage configuration the following five steps are necessary: the first step is to extend the wheels 9 by moving the retracting bar 9*b* accordingly. The second step is to unfasten the control chains 42, 43 from their respective chain hooks 25 and 26. In the third step the boom assembly, consisting of the stationary boom 30 and telescoping boom 40, is rotated about its pivot point so that its forward end is facing the top front of the plate 14 parallel to the pylon assembly consisting of the stationary pylon 17 and telescoping pylon 18. In the fourth step you remove the leg holding pins 6 and extract the removable legs 4 from their respective channel members 26. The fifth step is to insert the removable legs into their respective leg support receptacles 13. The CHDLC is now in its storage configuration as shown in FIG. 14.

Although the invention has been described in complete detail and pictorally shown in the accompanying drawings it is not to be limited to such details since many changes and modifications may be made to the CHDLC without departing from the spirit and scope thereof. Hence the CHDLC is described to cover any and all modifications and forms which may come within the language and scope of the appended claims.

I claim:

1. A Compact Heavy Duty Lifting Crane (CHDLC) comprising:

(a) a base assembly;

(b) a removable pylon plate attached to said base assembly;

(c) A stationary pylon cylinder means including an upper and a lower cylinder portions attached to said pylon plate, a vertically extending slot located in said upper cylinder portion, said lower cylinder portion including a plate mounted at the top thereof with an opening therein and a second opening located on the side thereof;

(d) a lifting jack mounted within said stationary pylon cylinder a jack control handle extending through said second opening in said stationary pylon cylinder;

(e) a telescoping pylon cylinder revolvingly positioned over said upper cylinder portion of said stationary pylon cylinder means so that it can be raised vertically by said lifting jack and having a locking hole at the lower end thereof and a cover rigidly attached to its top end, said cover having outward clevis members thereon with each member having a concentric hole therein;

(f) a releasable locking means for locking said telescoping pylon cylinder to said stationary pylon cylinder means to prevent radial movement relative thereto with respect to said stationary pylon;

(g) a hollow stationary boom having attached to its lower side a left and a right mounting plate with each plate having concentric holes that correspond to the holes in the mounting plates attached to said telescoping pylon cylinder;

(h) a clevis pin inserted through the set of corresponding holes in said mounting plates and clevis members whereby said stationary boom can be displaced about said pin in a vertical direction;

(i) a telescoping boom slideingly inserted into the hollow opening of said stationary boom whereby said telescoping boom can be displaced relative to said stationary boom;

(j) a locking means for locking said telescoping boom to said stationary boom to prevent movement of said telescoping boom with respect to said stationary boom;

(k) means for attaching a lifting chain and hook assembly to the front end of said telescoping boom;

(l) means for attaching a respective end of a first boom control chain and a second boom control chain to the back end of said stationary boom;

(m) means for selectively attaching an opposite end of said first boom control chain to said telescoping pylon cylinder;

(n) means for selectively attaching an opposite end of said second boom control chain to said base assembly;

(o) a first and a second channel section rigidly attached on opposite sides to the underside of said base assembly;

(p) a first removable leg and a second removable leg each sized to slidable fit into their respective said first and second channel sections;

(q) means for locking said first and said second removable legs into said first and said second channel sections, respectively;

(r) a first wheel and a second wheel rotatably attached to said first and said second removable legs;

(s) a third wheel and fourth wheel rotatably attached to said base assembly, means for retracting said third and fourth wheels when said CHDLC is in use, and extending said wheels when said CHDLC is in the storage mode.

(t) a caster wheel rotatably attached to the underside of said base; and (u) a first and second leg storage receptacle consisting of a channel section sized to receive said removable legs and where each storage receptacle is mounted vertically to the top side of said base whereby said removable legs can be removed from their functional position and inserted into said storage receptacles for storage.

2. The CHDLC as specified in claim 1 wherein said first boom control chain and said second boom control chain attaching means is a clevis structure rigidly attached to backside of said stationary boom.

3. The CHDLC as specified in claim 1 wherein when said first boom control chain is connected to said telescoping pylon cylinder and said second boom control chain is loose a vertical lifting boom angle is established that remains constant when said telescoping pylon is raised by said lifting jack.

4. The CHDLC as specified in claim 1 wherein when said second boom control chain is connected to said base assembly and said first chain is loose the angle of the boom increases as said telescoping pylon is raised by said lifting jack.

5. The CHDLC as specified in claim 1 wherein said means for selectively attaching said opposite end of said first boom control chain to said telescoping pylon cylinder is a hook attached to side of said telescoping pylon cylinder.

6. The CHDLC as specified in claim 1 wherein said means for selectively attaching said opposite end of said second boom control chain to said base assembly comprises a hook attached to said base assembly.

7. The CHDLC as specified in claim 1 wherein the means for retracting said third and fourth wheels comprises a conventional offset wheel axle that is rotated by a retracting bar.

8. The CHDLC as specified in claim 1 wherein the releasable locking means for locking said telescoping pylon to said stationary pylon cylinder means is a spring-loaded pylon lock consisting of a displaceable rod controlled by a handle assembly attached to the outside of said telescoping pylon cylinder such that when said telescoping pylon cylinder is locked said rod projects through a locking hole in said telescoping pylon cylinder and through said slot in said upper cylinder portion, said rod being held in said slot by the bias of the spring.

9. The CHDLC as specified in claim 1 wherein the means for locking said telescoping boom to said stationary boom comprises a pressure screw located on one surface of said stationary boom and when rotated makes contact with a surface of said telescoping boom.

10. The CHDLC as specified in claim 1 wherein the means for attaching said lifting chain and hook assembly to said telescoping boom includes a pair of upturned fingers outstanding from the underside forward end of said telescoping boom whereby said lifting chain and hook can be adjusted for height and held in place.

11. The CHDLC as specified in claim 1 wherein the means for locking said first and second removable legs to their respective channel sections includes a leg pin inserted through corresponding holes in said legs and said channel sections.

* * * * *